(12) United States Patent
Teshirogi et al.

(10) Patent No.: US 6,212,143 B1
(45) Date of Patent: Apr. 3, 2001

(54) SPINDLE MOTOR CONTROL SYSTEM FOR A DISK PLAYER

(75) Inventors: Kazuhiro Teshirogi, Neyagawa; Katsutoshi Sumida, Katano; Masanobu Shimizu, Hirakata, all of (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/072,028

(22) Filed: May 5, 1998

(30) Foreign Application Priority Data

May 13, 1997 (JP) .................................................. 9-121966

(51) Int. Cl.[7] ...................................................... G11B 7/00
(52) U.S. Cl. .............................................................. 369/50
(58) Field of Search ................................ 369/50, 54, 58, 369/47, 32

(56) References Cited

U.S. PATENT DOCUMENTS

| | | |
|---|---|---|
| 4,390,977 | 6/1983 | Onigata et al. . |
| 4,710,827 | 12/1987 | Okita . |
| 4,727,530 | 2/1988 | Tomisawa . |
| 4,866,695 | 9/1989 | Suzuki et al. . |
| 5,051,976 * | 9/1991 | Kawano et al. ........................ 369/50 |
| 5,243,587 | 9/1993 | Itoh et al. . |
| 5,377,295 | 12/1994 | Ueda et al. . |
| 5,420,841 | 5/1995 | Hwang . |
| 5,590,105 | 12/1996 | Enami et al. . |
| 5,627,811 * | 5/1997 | Morita et al. ........................... 369/50 |
| 5,666,341 | 9/1997 | Horibe et al. . |
| 5,699,335 * | 12/1997 | Joo et al. ................................ 369/50 |
| 5,751,676 * | 5/1998 | Kusano et al. ......................... 369/54 |
| 5,757,750 * | 5/1998 | Uemura ................................... 369/50 |
| 5,835,463 * | 11/1998 | Teshirogi et al. ....................... 369/50 |
| 5,870,363 * | 2/1999 | Sun et al. ................................ 369/50 |
| 5,982,724 * | 11/1999 | Hayashi et al. ........................ 369/50 |
| 5,982,728 * | 11/1999 | Okamoto et al. ....................... 369/50 |

FOREIGN PATENT DOCUMENTS

| | | |
|---|---|---|
| 5109182 | 4/1993 | (JP) . |
| 9-44988 | 2/1997 | (JP) . |

OTHER PUBLICATIONS

An English Language Abstract of JP 5–109182.
Copy of a German Examination Report issued Mar. 23, 1998.
Patent Abstracts of Japan, vol. 097, No. 006, dated Jun. 30, 1997.

* cited by examiner

Primary Examiner—Nabil Hindi
(74) Attorney, Agent, or Firm—Greenblum & Bernstein, P.L.C.

(57) ABSTRACT

In a CLV control of a spindle motor, a clock extracting unit (5) extracts a clock component from the reproduction data, and a CLV control unit (6) controls the spindle motor (8) in accordance with the extracted clock component to rotate the optical disk in a CLV mode, while a rotational velocity detecting unit (14, 15) detects a frequency or period value corresponding to a rotational velocity of the spindle motor (8) and a CAV control unit (16) controls the spindle motor (8) in accordance with the rotational velocity of the spindle motor detected by the rotational velocity detecting unit to thereby rotate the optical disk in a CAV mode. When a clock component supervisory unit (9) judges that the extracted clock component is within a given range, the first drive signal (Smdl) generated by the CLV control unit (6) is used for rotation in the CLV mode, and when judged that the extracted clock component is beyond the given range, the second drive signal (Smdr) generated by the CAV control unit (16) is used for rotation in the CAV mode.

28 Claims, 11 Drawing Sheets

SPINDLE MOTOR CONTROL SYSTEM FOR A DISK PLAYER

BACKGROUND OF THE INVENTION

1. Field of the Invention

The present invention relates to a spindle motor control system for controlling a spindle motor rotating an optical disk at a constant linear velocity for a disk player of an optical recording and/or reproducing apparatus, maintaining a data-reproducible rotation of a spindle motor even when reproduction data for controlling a constant linear velocity in rotating an optical disk is not obtained due to an off-track condition, noise or the like.

2. Description of the Prior Art

In a conventional optical recording/reproducing apparatus using an optical disk, various kinds of disks are widely used in a disk player, for example, a compact disk (CD), mini disk (MD) and the like, having a spiral recording track or concentric tracks formed thereon. In operating the disk player, in order to maintain a constant linear velocity (referred to as "CLV", hereinafter) in rotating an optical disk during a recording/reproducing operation, there has been employed a spindle motor servo-control system in the disk player for servo-controlling a spindle motor to obtain a rotation of the optical disk having a constant linear velocity (CLV), where the CLV control is performed based on rotational speed or angular velocity data of clock components extracted from periodic tracking servo digital data having a given period which the periodic data was previously recorded at a constant linear velocity along on a recording track or tracks formed on the optical disk.

The following briefly describes a general data format recorded on an optical disk in the case of using, for example, a compact disk having a spiral track along which periodic digital data is previously recorded in a CLV mode. This recorded digital data has durations each defined by a first transition and last transition from a leading edge to a trailing edge or vice versa, which each of the durations is limited to a predetermined range of, e.g., 3T to 11T assuming that T is a given reference period of, e.g., about 231 nano-sec (i.e., 4.3218 MHz) as shown in FIG. 10A. Also, two pieces of the longest data having the maximum duration of 11T are continually recorded in accordance with a frame sync signal having a given frequency of e.g. 44.1 kHz. Accordingly, when the digital data is reproduced, the leading and trailing edges are detected to calculate the longest period as shown in FIG. 10B. Thus, the spindle motor is controlled to have a rotational speed or angular velocity so that the calculated longest period corresponds to the maximum duration of 11T (=nearly 2.55 μsec in this case), thereby obtaining a CLV control of the spindle motor.

FIG. 9 shows an example of a conventional servo-control system for controlling a drive of a spindle motor used in an optical disk player.

In FIG. 9, reference numeral 1 denotes an optical disk having periodic digital data recorded, which the recorded data including tracking servo digital data is reproduced through an optical head 2, and the reproduced data is amplified by an RF amplifier 3 which serves as a waveform rectifying means. The RF amplifier 3 rectifies the reproduced data in waveform to be suitable for digital signal processing by slicing the waveform at a predetermined slice level having a given duty rate as shown in FIG. 11A.

Reference numeral 4 denotes a focus/tracking control unit for obtaining focus and tracking conditions of a light is beam spot applied from the optical head 2 onto the optical disk. Reference numeral 5 denotes a clock extracting unit which serves as e.g. a longest period calculating means for obtaining a CLV of the optical disk by extracting a clock signal component from the waveform-rectified reproduction data outputted from the RF amplifier 3 as shown in FIG. 11B.

When the focus and tracking servo-controls are both normally effected, the longest period calculated in accordance with the extracted clock component is proportional to the rotational speed of the spindle motor and then the output of the clock extracting unit 5 is fed to a CLV control unit 6 which controls a spindle motor 8 in accordance with the extracted clock component, by generating a motor drive signal so that the data of the longest period is coincident with the given longest period (11T in the above case) with reference to a reference clock generated by a reference clock generator (not shown). Thus, the drive signal outputted from the CLV control unit 6 is applied to the spindle motor via a loop filter (not shown) and a driver (not shown), so that the spindle motor 8 is driven in accordance with the drive signal to thereby rotate the optical disk under a CLV control mode.

Whereas, when a light spot from the optical head is in an off-track condition due to such as undesirable external shock or vibration, the slice level can not follow the variation in DC component of the applied signal in the RF amplifier 3, resulting in causing burst in rotation of the spindle motor.

In order to avoid this undesirable rotation, an off-track detection unit 13 is provided in parallel to the clock extracting unit 5 so that a switch 14 is switched off to cut off the transmission of the spindle motor drive signal in a CLV servo-control loop. In more detail, the off-track detection unit 13 receives the output of the RF amplifier 3 to detect the off-track condition of the light spot, and the output of the off-track detection unit 13 is applied to a control input terminal of the switch 14 so that the switch 14 is switched on/off of the transmission of the drive signal outputted from the CLV control unit 6 to the spindle motor 8, in accordance with the detection result detected by the off-track detection unit 13 as shown in FIGS. 11C and 11D.

By this conventional arrangement, when the light spot applied from the optical head 2 is in a state of an off-track condition on the optical disk 1, the off-track condition is detected by the off-track detection unit 13, and the switch 14 is then switched off based on the detection result outputted from the off-track detection unit 13 to thereby cut off the transmission of the drive signal outputted from the CLV control unit 6 to the spindle motor 8 so that the spindle motor is rotated only by its inertia, thereby preventing the burst rotation of the spindle motor.

In this conventional arrangement, however, when the reproduction data per se is not obtained in the recording/reproducing operation due to cracks and stains on the optical disk or due to external shock or vibrations applied from the outside, the clock signal component can not be extracted and the CLV control can not be effected, resulting in causing undesirable burst rotation of the optical disk in some cases.

Moreover, in the optical disk player, it is essentially required to maintain a rotational speed or angular velocity of the spindle motor sufficient to effect a recording/reproducing operation in stable during the operation. In view of this requirement, however, there has been further involved a problem in the conventional system such that the CLV control in rotation of the optical disk can not be maintained because the CLV servo-control loop is switched off.

SUMMARY OF THE INVENTION

The present invention has been developed with a view to substantially solving the above described disadvantages. Accordingly, an essential objective of the present invention is therefore to provide a spindle motor control system for maintaining a rotational speed of a CLV sufficient to reproduce data while preventing occurrence of burst rotation even when an off-track condition is caused or in the case where noises are added to the reproduction data.

In order to achieve the above objective, according to a first aspect of the present invention, a spindle motor control system arranged to control a spindle motor for rotating an optical disk at a constant linear velocity for recording/reproducing data comprises: a clock extracting unit which extracts a clock component from the reproduction data; a constant linear velocity control unit for controlling the spindle motor by generating a first drive signal in accordance with the extracted clock component to thereby rotate the optical disk in a constant linear velocity mode; a rotational velocity detecting unit for detecting a value corresponding to a rotational velocity of the spindle motor; a constant angular velocity (referred to as "CAV" hereinafter) control unit for controlling the spindle motor by generating a second drive signal in accordance with the rotational velocity of the spindle motor detected by the rotational velocity detecting unit to thereby rotate the optical disk in a CAV mode; and a clock component judging unit for judging whether or not the clock component extracted from the reproduced data is within a given range.

In the spindle motor control system, when the extracted clock component is within the given range, the first drive signal generated by said constant linear velocity control unit is applied to the spindle motor for rotation in the constant linear velocity mode, and when the extracted clock component is beyond the given range, the second drive signal generated by the CAV control unit is applied to the spindle motor for rotation in the constant rotation velocity mode.

The rotational velocity detecting unit is preferably comprised of a frequency generator unit for generating a frequency value in accordance with the rotational velocity of the spindle motor and a period detector unit for detecting a period value based on the frequency value, which the detected period value is applied to the CAV control unit.

The spindle motor control system further preferably comprises a memory unit for storing the period value detected by said period detector unit at predetermined time intervals when the extracted clock component is within the given range and the remaining time thereof is more than a predetermined value.

The memory unit preferably stores a mean value of the period for a predetermined time interval when the spindle motor is rotated in the constant linear velocity mode, and the stored mean value of the period is applied to said CAV control unit when the spindle motor is rotated in the CAV mode.

The CAV control unit controls the drive of the spindle motor so that the period value detected by said period detector unit is made equal to the mean value of the period applied from said memory unit.

According to a second aspect of the present invention, the spindle motor control system further preferably comprises a drive signal judging unit for judging whether or not the level of the spindle motor drive signal is beyond a given range and whether or not the remaining time period thereof is over a predetermined time interval. In this system, when the drive signal judging unit judges that the level of the spindle motor drive signal is beyond the given range over the predetermined time interval, the mean period value stored in the memory unit is applied to the CAV control unit as a target period value for the rotational velocity of the spindle motor.

In another aspect of the present invention, a spindle motor control method for controlling a spindle motor for rotating an optical disk at a constant linear velocity for recording/reproducing data, comprises the steps of: extracting a clock component from the reproduction data; controlling the spindle motor by generating a first drive signal in accordance with the extracted clock component to thereby rotate the optical disk in a constant linear velocity mode; detecting a value corresponding to a rotational velocity of the spindle motor; controlling the spindle motor by generating a second drive signal in accordance with the detected rotational velocity of the spindle motor to thereby rotate the optical disk in a CAV mode; and judging whether or not the clock component extracted from the reproduced data is within a given range.

In this method, when the extracted clock component is within the given range, the first drive signal is applied to the spindle motor for rotation in the constant linear velocity mode, and when the extracted clock component is beyond the given range, the second drive signal is applied to the spindle motor for rotation in the constant rotation velocity mode.

Therefore, according to the first aspect of the present invention, when the spindle motor is driven in the CLV mode in stable, the mean value of the FG period data for a given time period is stored in the memory unit at predetermined time intervals, and in the meanwhile, when the clock components of the reproduction data can not be extracted, the spindle motor is driven in accordance with the mean period value stored in the memory unit.

By this arrangement, even in the case where the reproduction data per se including the clock signal components for use in the CLV control is not obtained due to cracks and stains on the optical disk or due to external shock or vibrations applied from the outside, the stable rotation of the optical disk can be maintained for reproducing the data without causing undesirable burst rotation of the optical disk.

Further according to the second aspect of the present invention, even in the case where it is hard for the clock period supervisory unit to decide whether the clock components of the reproduction data is within or beyond the given range over the predetermined time period, the drive signal supervisory unit judges that the spindle motor drive signal is beyond the given range over the predetermined time interval, so that the spindle motor can be rotated in accordance with the mean value of the FG period which was last stored in the memory unit under the CLV control mode, so that the spindle motor can be stably rotated in the CAV control mode, thereby maintaining a CLV in rotating the optical disk.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
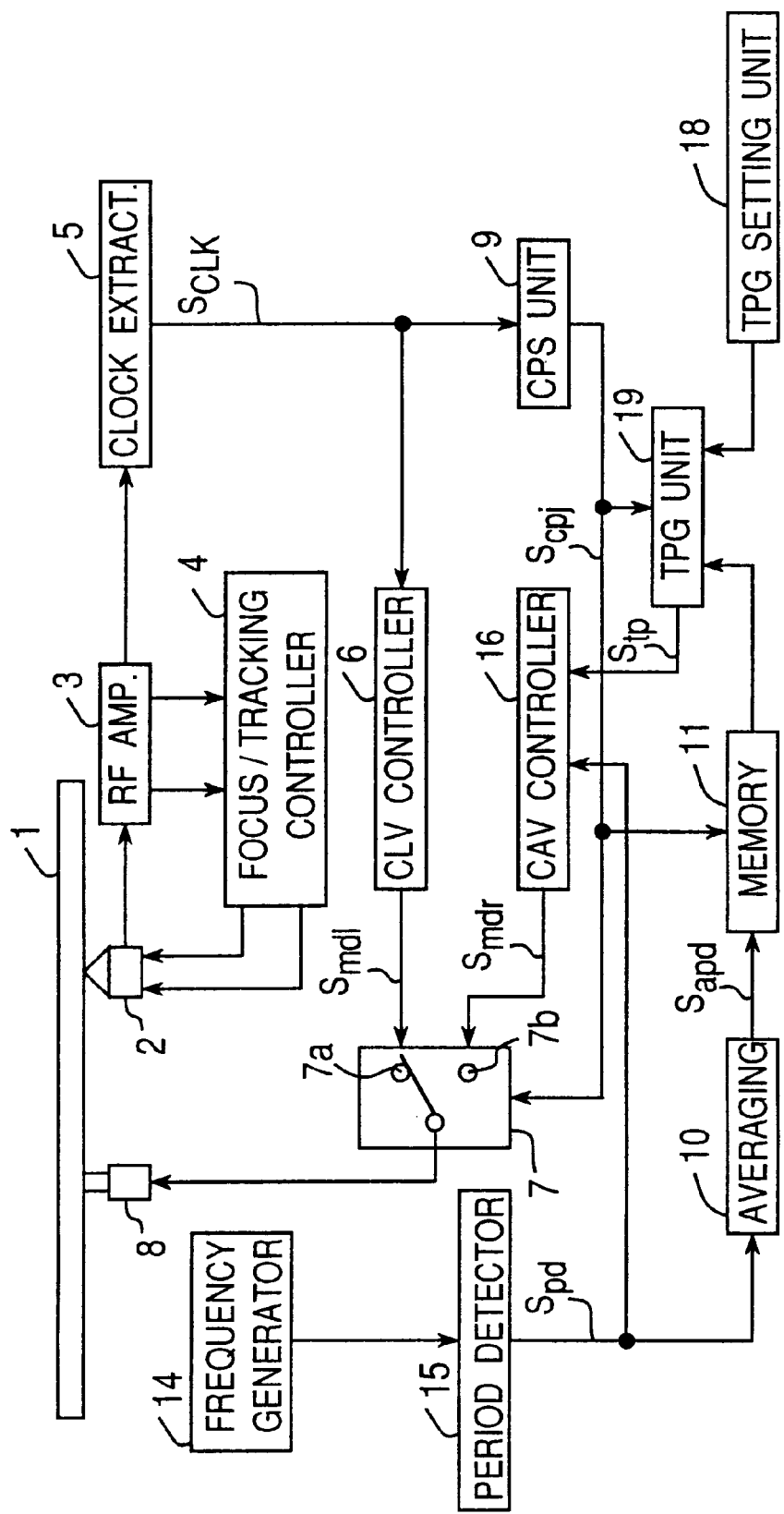
FIG. 1 is a block diagram showing a construction of a spindle motor control system according to a first embodiment of the present invention.

Before the description proceeds, it is to be noted that, since the basic structures of the preferred embodiments are in common to the conventional one, like parts are designated by the same reference numerals throughout the accompanying drawings.

Hereinbelow, a first preferred embodiment of the present invention is described with reference to FIGS. 1 through 4.

In FIG. 1, reference numeral 1 denotes an optical disk from which previously recorded data is reproduced through an optical head 2 while rotation of the optical disk is maintained by a spindle motor 8. The reproduced data is fed to a waveform rectifying unit 3 which is comprised of e.g. a RF amplifier where the data is rectified in waveform through amplification. The RF amplifier 3 also generates a focus error signal and tracking error signal, which the error signals are fed to a focus/tracking control unit 4. The focus/tracking control unit 4 controls a focus/tracking of a light beam spot applied from the optical head 2 to the optical disk 1, based on the focus error and tracking error signals outputted from the RF amplifier 3. The optical disk 1, optical head 2, RF amplifier 3 and focus/tracking control unit 4 constitute a focus/tracking servo-control loop circuit.

Reference numeral 5 denotes a clock extracting unit which receives the waveform-rectified reproduction data outputted from the RF amplifier 3 and extracts clock components from the waveform-rectified reproduction data. The clock extracting unit 5 is comprised of, for example, a PLL circuit. The extracted clock components outputted from the clock extracting unit 5 are fed in common to both a CLV control unit 6 and a clock period supervisory (CPS) unit 9.

The CLV control unit 6 is comprised of, for example, a filtering unit, outputting a spindle motor drive signal (Smdl) which is fed to a first terminal 7a of a changeover switching unit 7 and then fed to the spindle motor 8. The spindle motor 8 is controlled in accordance with the extracted clock component so that the extracted clock component has a period of a given reference clock with a sync pattern.

Thus, the spindle motor is driven in accordance with the drive signal outputted from the CLV control unit 6 to thereby rotate the optical disk in a CLV mode. In this arrangement, the optical disk 1, optical head 2, RF amplifier 3, clock extracting unit 5, CLV control unit 6 and spindle motor 8 constitute a CLV control loop circuit for obtaining the CLV mode.

The CPS unit 9 is comprised of counters, comparators and the like, generating binary data of High or Low level as a clock period judgment signal (Scpj) to judge the period of the clock component extracted from the reproduced data, where the High level is generated when the extracted clock component has a period within a given range for a time interval larger than a predetermined time value, while the Low level is generated in the other cases. The output level of the CPS unit 9 is operatively applied in common to a memory unit 11 and to the changeover switching unit 7 for switching between the first and second terminals 7a and 7b thereof.

Reference numeral 14 denotes a frequency generator (FG) unit which generates a FG signal having a frequency proportional to a rotation number or revolution per minute (r.p.m.) of the spindle motor 8. The FG signal is fed to a period detector (PD) unit 15 which detects a period of the FG signal generated by the FG unit 14. The detected period (Spd) output from the period detector (PD) unit 15 is fed in common to both a constant angular velocity (CAV) control unit 16 and an averaging unit 10. The output of the CAV control unit 16 is connected to the second terminal 7b of the changeover switching unit 7 for a CAV mode.

The averaging unit 10 generates a mean value (Sapd) of the detected periods generated by the PD unit 15 at given constant time intervals. The mean value (Sapd) output from the averaging unit 10 is held in the memory unit 11 in accordance with the output level of the CPS unit 9. In more detail, the memory unit 11 holds the output Sapd of the averaging unit 10 when the High level output is generated by the CPS unit 9, namely, when the extracted clock component has a period within the given range for a time more than a predetermined time interval. The mean value held in the memory unit 11 is read out and applied to a target period generator (TPG) unit 19 in accordance with the output level of the CPS unit 9.

The TPG unit 19 is also fed with a target period which is set by a target period setting (TPS) unit 18. In specific, when the drive of the spindle motor is started for initially accessing or skipping in access on the optical disks the target period value is so determined by the TPS unit 18 as to rotate the spindle motor with the FG signal generated by the frequency generator unit 14 so that the FG signal has the same target period value as that set by the TPS unit 18.

In the meanwhile, the output (Scpj) of the CPS unit 9 is also operatively connected to the TPG unit 19 so that the TPG unit 19 generates a target period signal (Stp) to be applied to the CAV control unit 16 in accordance with the output level of the CPS unit 9. Thus, the TPG unit 19 generates as the output signal Stp selectively any one of the signals between the target period set by the TPS unit 18 and the mean period value held by the memory unit 11, to be supplied to the CAV control unit 16.

The changeover switching unit 7 is switched between the first and second terminals 7a and 7b in accordance with the output level of the CPS unit 9, where the first terminal 7a is selected for connecting the output (Smdl) of the CLV control unit 6 while the second terminal 7b is selected for connecting the output (Smdr) of the CAV control unit 16, and any one of the outputs is selectively used as a motor drive signal to be applied to the spindle motor 8 via a Digital/Analogue converter (not shown) and via a driver unit (not shown) for power amplification.

The spindle motor 8, frequency generator (FG) unit 14, period detector (PD) unit 15 and CAV control unit 16 constitute a CAV control loop circuit for obtaining the CAV mode.

Figure 2:
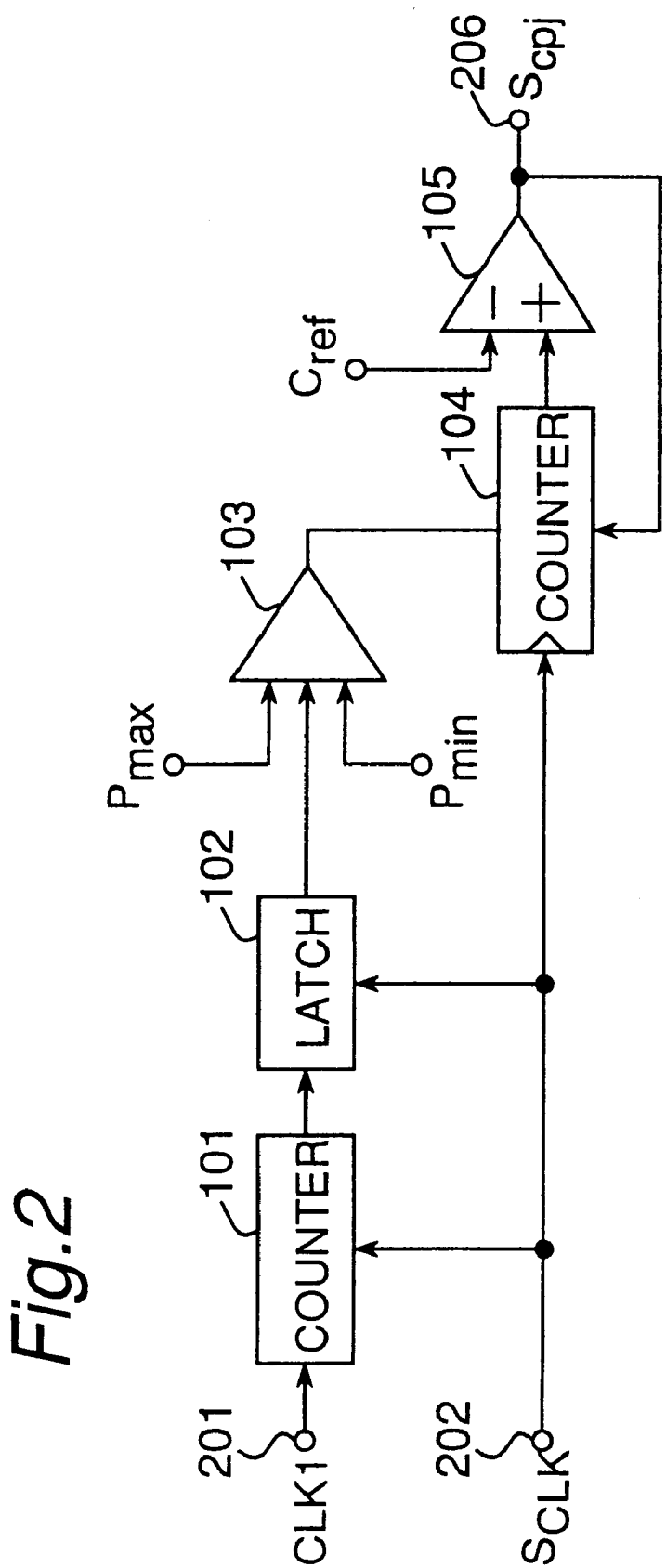
FIG. 2 is a block diagram showing a construction of a clock period supervisory unit used in the first embodiment shown in FIG. 1.

FIG. 2 shows an example of a construction of the CPS unit 9. In FIG. 2, reference numeral 101 denotes a first counter for counting the number of the periods of the clock components $S_{CLK}$ outputted from the clock extracting (CE) unit 5, based on a first reference clock signal CLK1 having a sufficiently high given frequency for effecting the counting operation. Reference numeral 102 denotes a first latch unit in which the counted data fed from the first counter 101 is latched at the timing of the clock component signal $S_{CLK}$ extracted by the clock extracting unit 5.

Reference numeral 103 denotes a window comparator for judging whether or not the level of the output data from the first latch unit 102 is within a range between Pmax representing the maximum period level and Pmin representing the minimum period level, where Pmax and Pmin levels are defined by a given range of, e.g., ±10% of the mean value (e.g., 7.5 KHz in a mini disk for ROM). When the output level of the first latch unit 102 is within the range of Pmax and Pmin, the window comparator 103 generates an output of H level, and otherwise generates an output of L level, which the output of H or L level is applied to a second counter 104. When the output of the window comparator 103 is of H level, the count value counted in the second counter 104 is cleared up, and the output of the second counter 104 is fed to a comparator 105.

In the comparator 105, the output level of the second counter 104 is compared with a reference value (Cref) representing the minimum time interval. When the output level of the second counter 104 is smaller than the reference value (Cref), the comparator 105 outputs a L level signal, and otherwise outputs a H level signal. The L or H level signal outputted from the comparator 105 is fed back to the second counter 104, and the output of the comparator 105 is also generated from the CPS unit 9 as a clock period judgment signal Scpj. When the output of the comparator 105 is of L level, the second counter 104 receives this L level signal and counts the clock component signal $S_{CLK}$ extracted from the reproduced data.

A In other words, when the clock component signal $S_{CLK}$ level is within the range of Pmax and Pmin and the remaining time thereof is larger than the reference time interval (represented by Cref), the clock period judgment signal Scpj of H level is outputted from the CPS unit 9 to control the switching unit 7, turning on the first terminal 7a side to receive the signal from the CLV control unit 6 and turning off the second terminal 7b side to cut off the signal from the CAV control unit 16, thereby maintaining a data-reproducible rotation of the spindle motor in the CLV mode.

Figure 3:
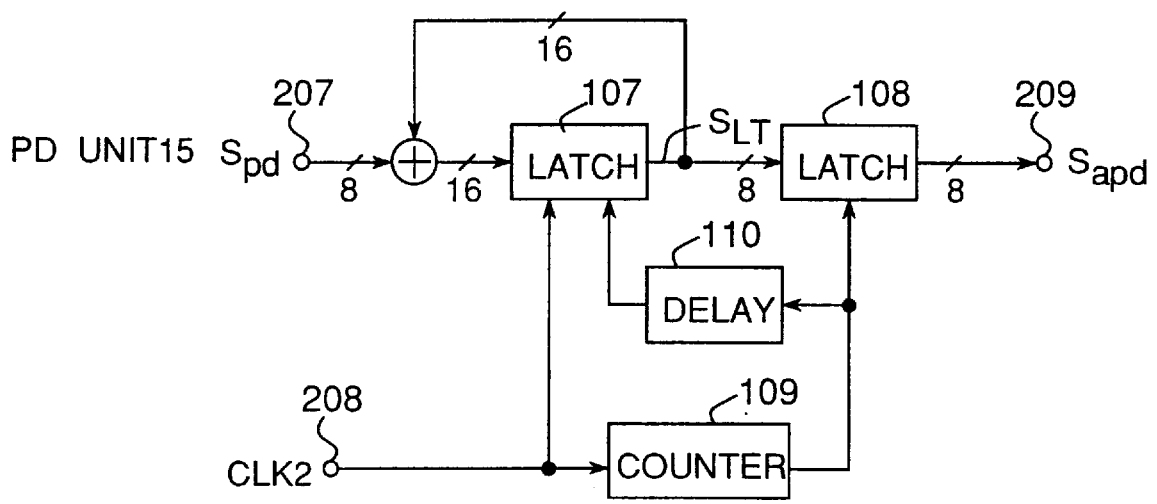
FIG. 3 is a block diagram showing a construction of an averaging unit used in the first embodiment shown in FIG. 1.

FIG. 3 shows an example of a construction of the averaging unit 10 which includes a first input terminal 207 for receiving the detected period signal (Spd) of 8 bit digital data generated by the period detector (PD) unit 15 and which further includes an adder 106 and a second latch unit 107 of which the output $S_{LT}$ is fed back to the adder 106, so that the detected period signal Spd and the output $S_{LT}$ of the second latch unit 107 are added by the adder 106 to generate 16-bit data which is applied to the second latch unit 107. The second latch unit 107 holds the output of 16 bits fed from the adder 106 at time intervals of a given period of a given second clock signal CLK2 applied through a second input terminal 208 while the latched data held in the second latch unit 107 is cleared up based on the output of a delay unit 110, and then the output of the second latch unit 107 is partially applied to a third latch unit 108.

The averaging unit 10 further includes a third counter 109 comprised of an 8-bit counter which generates a pulse at a timing of every 256 countings of the second clock signal CLK2, which the generated pulse is applied to both the third latch unit 108 and the delay unit 110 for delaying the applied pulse. The third latch unit 108 holds the high-order 8 bit data among from the 16 bit data $S_{LT}$ outputted from the second latch unit 107, at time intervals of the period of the output pulses of the third counter 109, and then generates an average period signal (Sapd) through an output terminal 209 of the averaging unit 10.

In other words, the average period signal Sapd indicates the mean value of the detected period signals (Spd) in a time interval corresponding to the count value 256 of the second clock signal CLK2. Thus, the averaging unit 10 calculates a mean value of the detected period signals (Spd) generated by the period detector (PD) unit 15 for the given time period of 256 countings.

In a modified example, the averaging unit 10 may be comprised of a low-pass filter for reinforcing low frequency components of the output signals Spd generated by the period detector (PD) unit 15 to calculate the low components of the output of the period detector (PD) unit 15. The insertion of the low-pass filter effectively prevents any adverse influences on improving effects when D.C.-like torque disturbances occur, even if the bit length of a memory value of a memory unit is made shorter than the bit length of the rotation error of the drive control signal.

In more detail, there are essentially two factors which determine changes in the drive signal to give CLV. Firstly, as the radial position moves from the center of the disk to the outside of the disk, there will be a gradual reduction in the drive signal to give CLV, since for any given angular velocity, the linear velocity towards the center will be significantly less than that towards the outside. Accordingly, there is a gradual change in the drive signal required to compensate for this, namely, a low frequency change. There may also be variations in the drive signal to give CLV due to deviations at any particular radial position. Such variations require a much more rapid variation in the drive signal to give the required CLV, namely, a high frequency component. Over the course of a complete revolution, these high frequency variations will substantially cancel each other out. Accordingly, taking a mean value of the FG period over a predetermined time period, or calculating only the low frequency change in drive signal will give substantially the same result. Therefore, the reference to "low pass filter" and "low frequency component" are, in effect, averaging.

The following describes an operation of the first embodiment of the spindle motor control system according to the present invention.

Initially, the focus/tracking control is performed by the focus/tracking control loop comprised of the optical disk 1, optical head 2, RF amplifier 3 and focus/tracking control unit 4, while the CLV control is performed by the CLV control loop comprised of the optical disk 1, optical head 2, RF amplifier 3, clock extracting unit 5, CLV control unit 6 and spindle motor 8.

In the CLV control mode, the first terminal 7a of the changeover switching unit 7 is usually selected on, so that the spindle motor drive signal Smdl outputted from the CLV control unit 6 is applied to the spindle motor 8.

Firstly, the clock component signal $S_{CLK}$ is extracted by the clock extracting unit 5 from the reproduction data rectified in waveform by the RF amplifier 3. Then, it is judged by the CPS unit 9 whether or not the period of the extracted clock component signal $S_{CLK}$ is within the given range and the remaining time thereof is larger than the predetermined time period (Cref), thereby generating the clock period judgment signal Scpj of the binary data.

If detection result of the clock period judgment is within the given range for a time larger than the predetermined time (Cref), the CLV control calculation is performed by the CLV control unit 6, and then the spindle motor drive signal Smdl generated by the CLV control unit 6 is transmitted to the spindle motor 8 by selecting the connection of the first terminal 7a in the changeover switching unit 7.

In the meanwhile, the frequency generator (FG) unit 14 generates the FG signal having a frequency proportional to the r.p.m., i.e., rotational speed or angular velocity of the spindle motor 8, and the period of the FG signal is calculated by the period detector (PD) unit 15. Then, the mean value of the detected periods (Spd) output from the period detector unit 15 is calculated by the averaging unit 10 every predetermined time intervals. The calculated mean value (Sapd) is renewed and held in the memory unit 11 when the CPS unit 9 judges that the period of the extracted clock component signal $S_{CLK}$ is within the given range for a time larger than the predetermined time value.

When the CPS unit 9 judges that the period of the extracted clock component $S_{CLK}$ is beyond the given range over the predetermined time interval, the mean value Sapd stored last in the memory unit 11 is read out at this time and fed to the TPG unit 19.

In more detail, in the case where the reproduction data per se including the clock signal components for use in the CLV control operation is not obtained in the recording/reproducing operation due to cracks and stains on the optical disk or due to external shock or vibrations applied from the outside, the CPS unit 9 first judges that the period level of the clock component extracted by the clock extracting unit 5 is beyond the given range of Pmax and Pmin. Then, the memory unit 11 stops the renewal of holding the mean value Sapd and then outputs the last stored data which has been held immediately before the level of the clock component exceeds the given range, which the read out data from the memory unit 11 is applied to the CAV control unit 16 as the target period (Stp) by way of the TPG unit 19.

At the same time, the changeover switching unit 7 is switched from the first terminal 7a to the second terminal 7b for connecting the output (Smdr) of the CAV control unit 16 while the first terminal 7a is opened to turn off the transmission of the output Smdl from the CLV control unit 6.

Then, the CAV control operation is performed by the CAV control loop circuit comprised of the frequency generator unit 14, period detector unit 15, CAV control unit 16 and spindle motor 8 in a manner such that the target period value (Stp) output from the TPG unit 19 is made equal to the detected period value (Spd) output from the period detector unit 15. By performing this CAV control operation in the CAV mode, the reproduction data including the clock components can be retained, and when the CPS unit 9 detects that the period of the extracted clock component becomes within the given range for more than the predetermined time value, the changeover switching unit 7 is switched from the second terminal 7b to the first terminal 7a to connect to the CLV control unit 6 for recovering the CLV control.

According to the first aspect of the present invention, it is firstly determined whether the period of the extracted clock components falls within a predetermined range of acceptable periods, and when the clock components have a period forming within this range, an average value of the FG period is stored in the memory unit. This mean value is stored at predetermined time intervals, namely, an updated value is stored, for example, every few seconds. In this way, either the actual drive signal generated by the CLV control unit or the previously stored mean period value can be used to control the spindle motor.

Thus, even when the clock components of the reproduction data can not be extracted by the clock extracting unit 5, the spindle motor can be rotated under the CAV control mode in accordance with the mean period value Sapd of the FG signal generated by the frequency generator unit 14, where the mean period value has been last stored in the memory unit 11 under the CLV control mode, so that the spindle motor can be stably rotated in the CAV mode until the clock components of the reproduction data can be extracted to recover the CLV mode.

As described above, according to the first embodiment of the present invention, when the spindle motor 8 is driven in the CLV mode in stable, the mean value (Sapd) of the detected period values of the FG signal for a given time period is held in the memory unit 11 every predetermined time intervals, and in the meanwhile, when the clock components of the reproduction data can not be extracted, the spindle motor is driven in the CAV control mode attained by the CAV control unit 16 with use of the period mean value read out from the memory unit 11.

By this arrangement, even in the case where the reproduction data per se including the clock signal components for use in the CLV control is not obtained due to cracks and stains on the optical disk or due to external shock or vibrations applied from the outside, the stable rotation of the optical disk can be maintained by selecting the CAV control mode for reproducing the data without causing undesirable burst rotation of the optical disk.

It is noted here that, in order to detect an off-track condition of the light beam spot, an off-track detection unit (not shown) may be provided in parallel to the clock extracting unit S for directly controlling the changeover switching unit 7 in accordance with the detection result detected by the off-track detection unit.

In the present embodiment, although the clock extracting unit 5, CLV control unit 6, CPS unit 9, averaging unit 10, period detector unit 15, TPG unit 19, CAV control unit 16 and the like are individually constructed by way of circuitry arrangement, these constructions can be embodied in software for a microcomputer.

Figure 4:
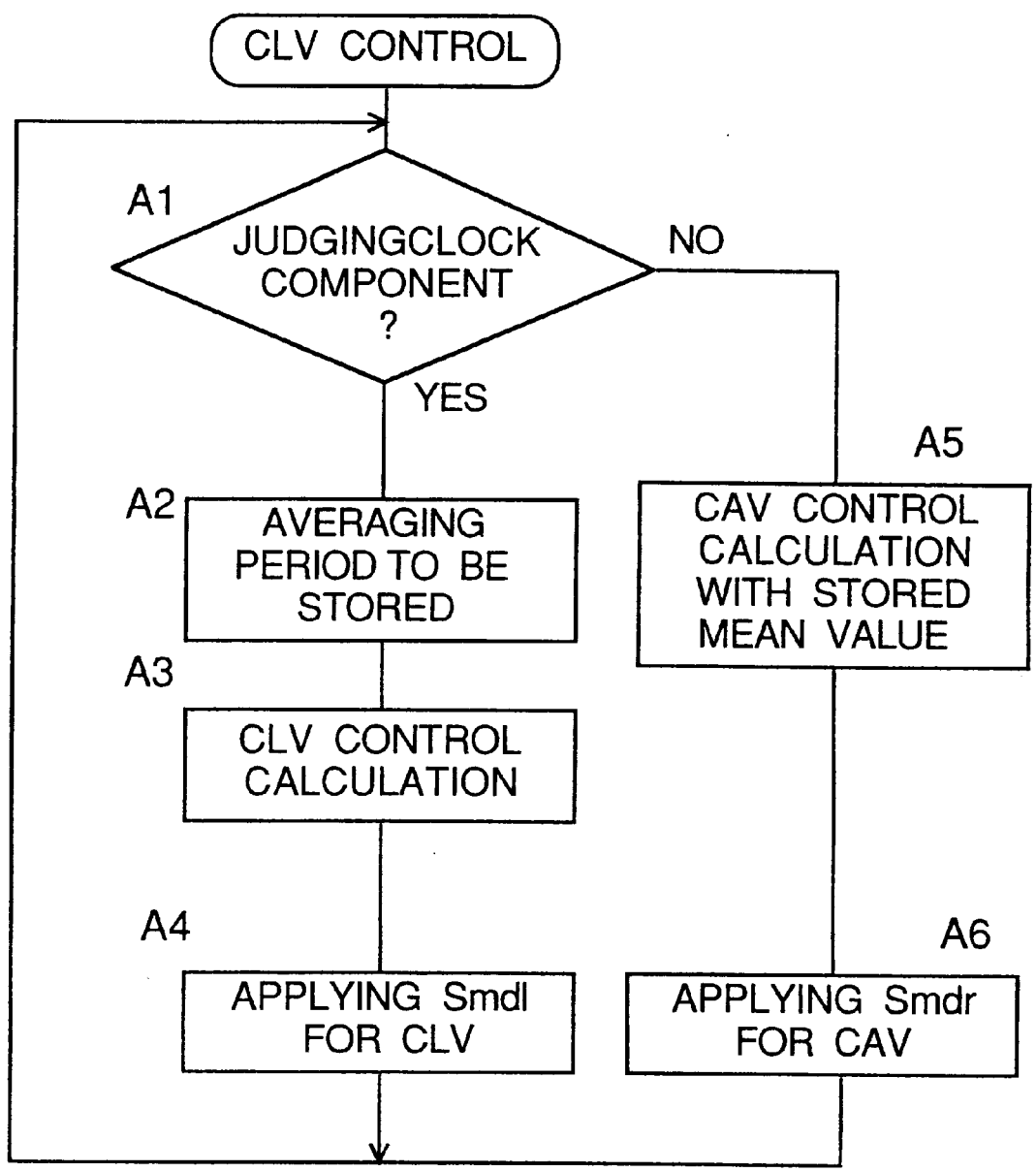
FIG. 4 is a flow chart explaining an operation of: the first embodiment of the present invention.

The following describes an operation of the first embodiment of the spindle motor control system using a soft ware of a microcomputer with reference to a flow chart shown in FIG. 4.

Initially, the focus/tracking control is performed, while the CLV control is performed by the CLV control process and the clock component signal $S_{CLK}$ is extracted from the reproduction data rectified in waveform by RF amplification.

In the first step A1, it is judged whether or not the period of the extracted clock component signal $S_{CLK}$ is within a given range for a time interval larger than a predetermined time period, thereby generating a clock period judgment signal (Scpj).

If detection result is "Yes" in the step A1, the program is advanced to step A2 and the period values of the FG signal having a frequency proportional to the rotational velocity of the spindle motor are averaged and the resultant mean period value is held in the memory section, renewing the mean value. Then, in the step A3, the CLV control calculation is performed in accordance with the extracted clock component so that the clock component of the reproduction data read out from the optical disk is made equal to the target clock component value.

Next in the step A4, the spindle motor drive signal (Smdl) obtained by the CLV control calculation is applied to the spindle motor 8 by selecting the connection of the first terminal side (7a) for the CLV control mode.

If the judgment is "No" in the step A1, the program is advanced to the step A5 and the mean value Sapd of the FG period held last in the memory section is read out as the target period to obtain the motor drive signal (Smdr) for the CAV control mode by the CAV control calculation. Then, in the next step A6, the motor drive signal (Smdr) for the CAV control mode is applied to the spindle motor 8 by selecting the connection to the second terminal side (7b).

Thus, even when the clock signal components of the reproduction data can not be extracted, the spindle motor can be rotated under the CAV control mode in accordance with the mean period value Sapd of the FG signal, where the mean period value has been last stored in the memory section under the CLV control mode, so that the spindle motor can be stably rotated in the CAV mode until the clock components of the reproduction data can be extracted to recover the CLV mode.

Figure 5:
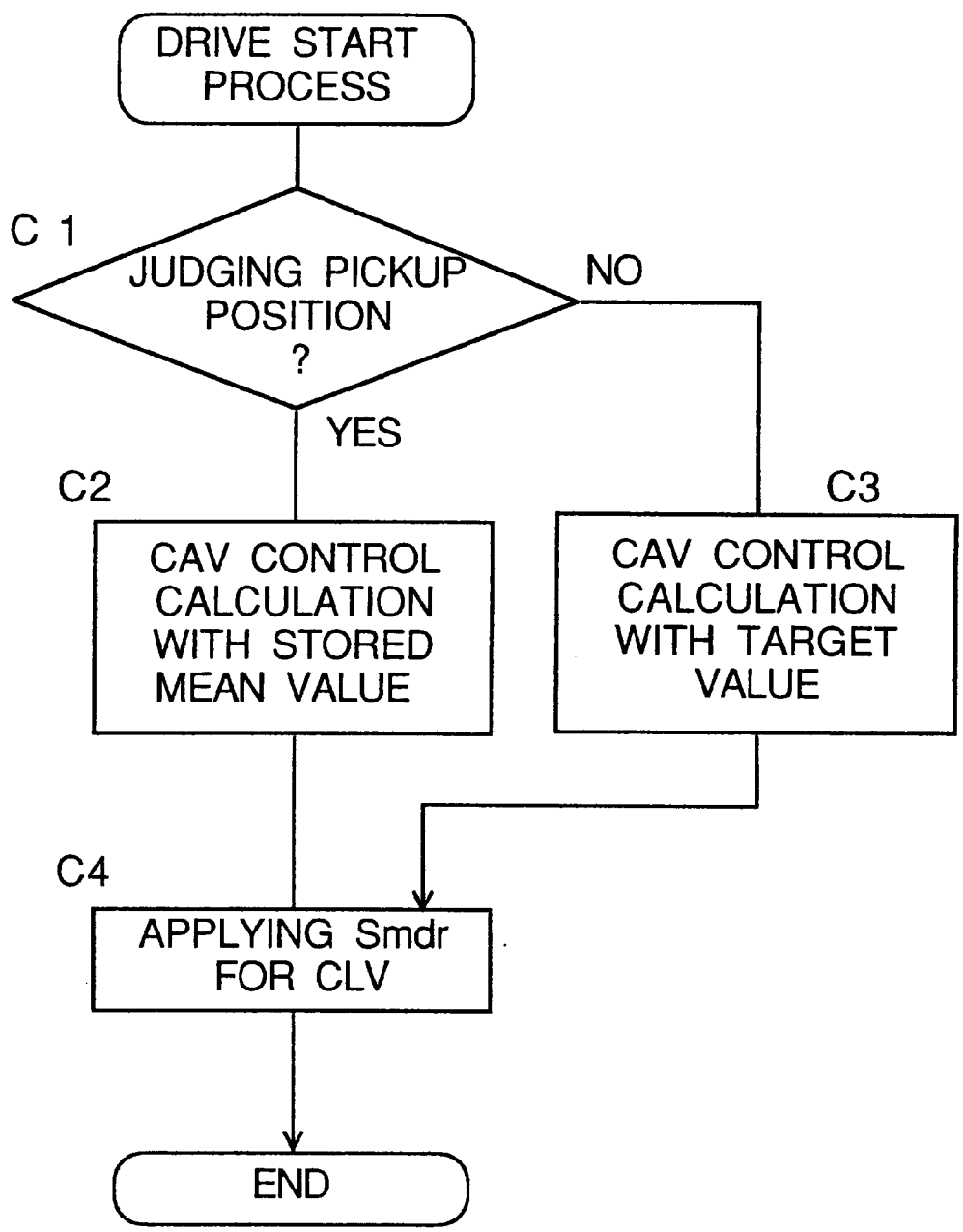
FIG. 5 is a flow chart explaining a drive starting operation of the first embodiment of the present invention.

The following describes an operation of the spindle motor control method with reference to FIG. 5 when the drive of the spindle motor is started.

When the drive of the spindle motor is started from the static state thereof, the changeover switching unit 7 is initially switched off the first terminal 7a side to switch on the second terminal 7b side for setting the CAV control mode from the CLV control mode.

In the first step C1, it is judged whether or not the pickup position of the optical head 2 is nearly coincident with the pickup position before the drive of the spindle motor is stopped. When the judgment is "Yes" in the step C1, the program is advanced to the step C2 and the mean value Sapd of the FG period held last in the memory unit is read out as the target period to obtain the motor drive signal (Smdr) for the CAV control mode by the CAV control calculation.

When "No" in the step C1, the program is advanced to the step C3 and a predetermined target period value set by the target period setting unit 18 is applied to the CAV control unit 16 via the TPG unit 19 to thereby perform the CAV control calculation.

It is noted here that the target period is previously set to a value near or approximately equal to the detection period value detected by the period detector unit 15 according to the rotation of the spindle motor 8 when the pickup position is traced, for example, on the innermost track on the optical disk in the CLV mode.

Then, in the next step C4, the motor drive signal (Smdr) for the CAV control mode is applied to the spindle motor 8 by selecting the second terminal side (7b) side. Thus, the drive starting process is ended and the program is transferred to the CLV control process shown in the flow chart of FIG. 4.

As described above, when the spindle motor 8 is driven in the CLV mode in stable, the mean value (Sapd) of the detected periods of the FG signals for a given time period is held in the memory section every predetermined time intervals, and in the meanwhile, when the clock components of the reproduction data can not be extracted, the spindle motor is driven in the CAV control mode attained by the CAV control calculation with use of the period mean value read out of the memory section.

By these steps, even in the case where the reproduction data per se including the clock signal components for use in the CLV control is not obtained due to cracks and stains on the optical disk or due to external shock or vibrations applied from the outside, the stable rotation of the optical disk can be maintained in the CAV control mode for reproducing the data without causing undesirable burst rotation of the optical disk.

SECOND EMBODIMENT

Figure 6:
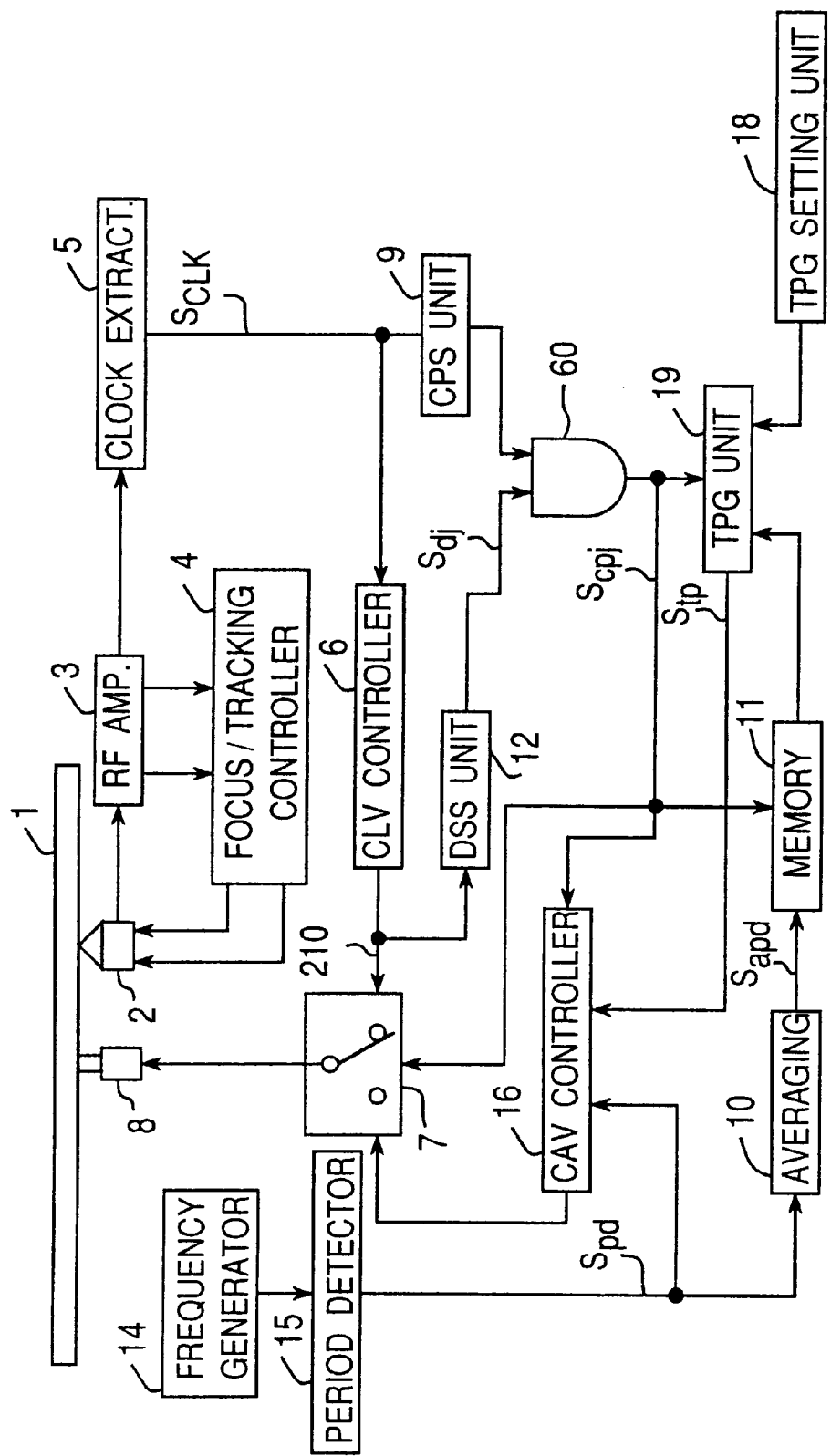
FIG. 6 is a block diagram showing a construction of a spindle motor control system according to a second embodiment of the present invention.
Figure 7:
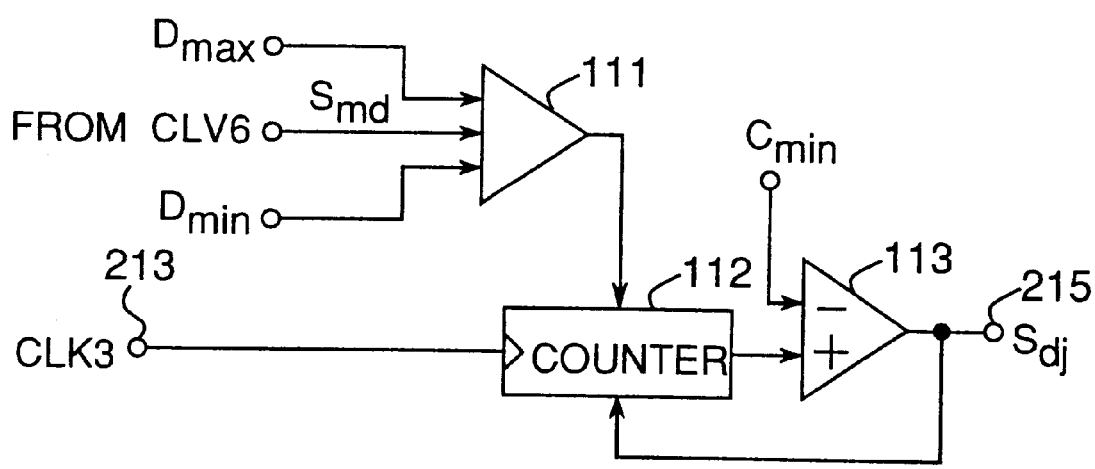
FIG. 7 is a block diagram showing a construction of a drive signal supervisory unit used in the second embodiment shown in FIG. 6.
Figure 8:
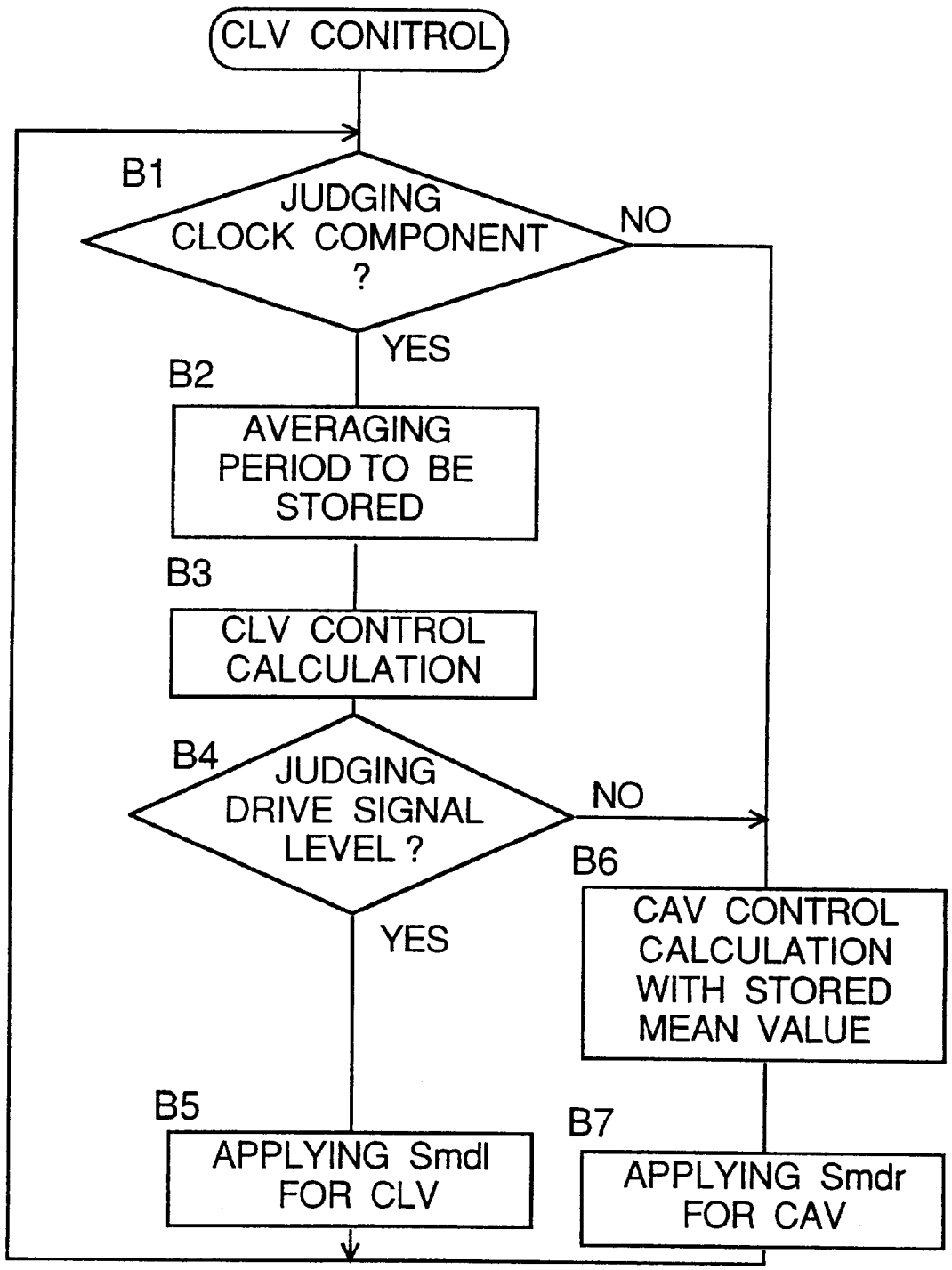
FIG. 8 is a flow chart explaining an operation of the second embodiment of the present invention.
Figure 9:
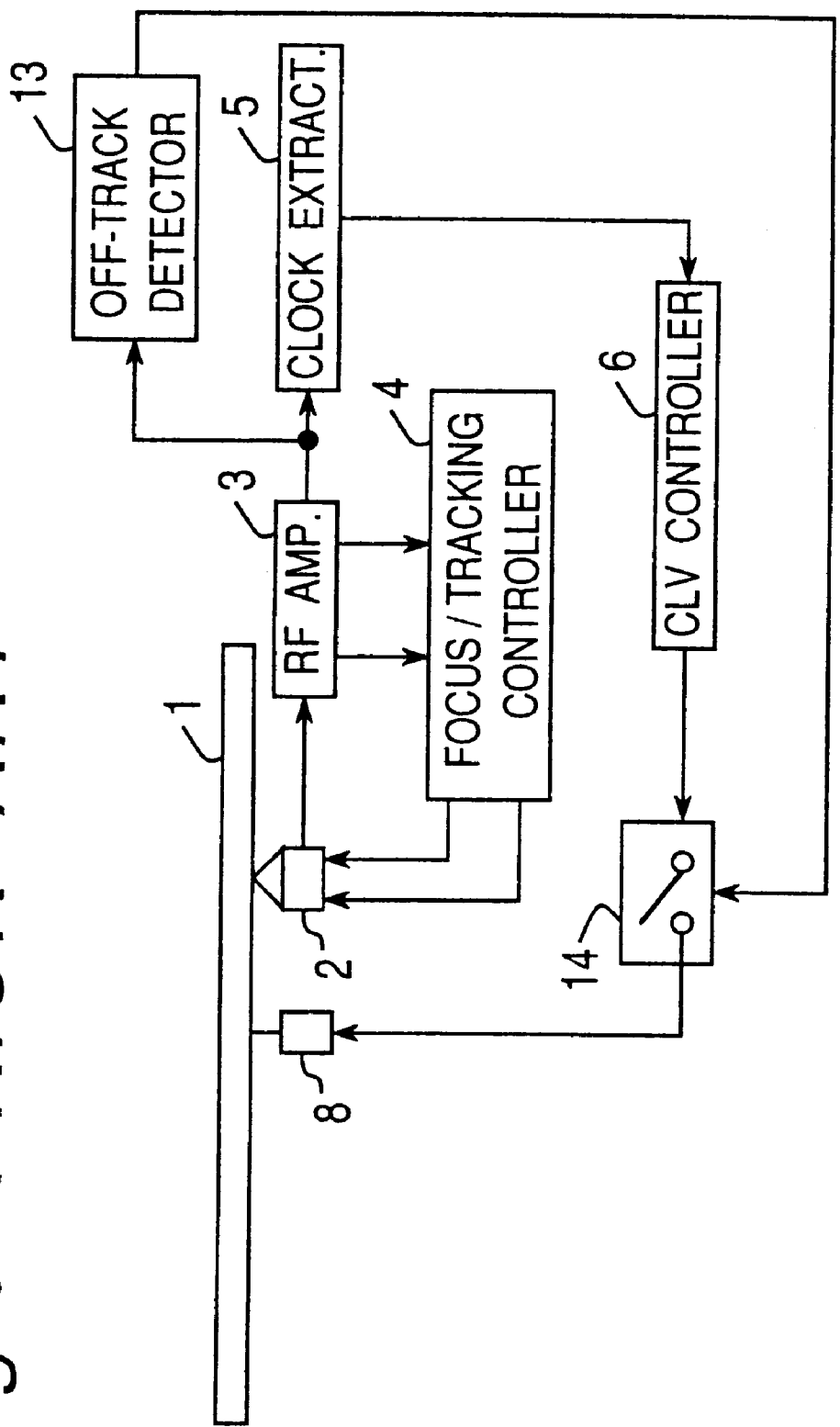
FIG. 9 is a block diagram showing a construction of a conventional spindle motor control system.
Figure 10A:
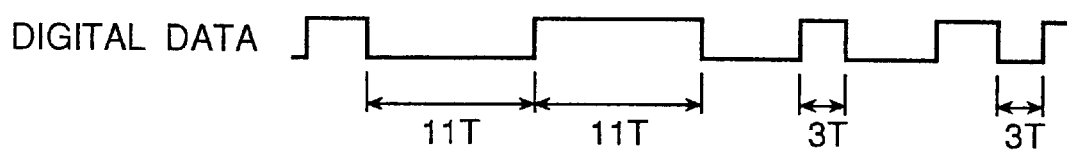
FIGS. 10A and 10B are timing charts showing durations of the recorded digital data format and leading/trailing edge detection thereof, respectively.
Figure 10B:
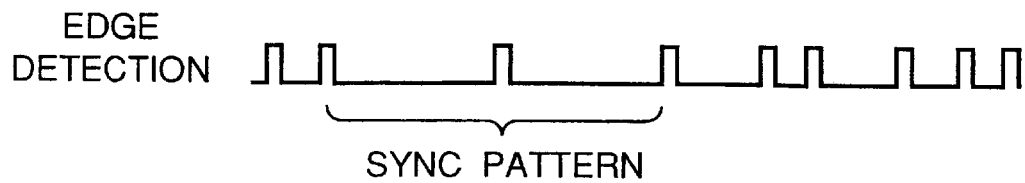
Figure 11A:
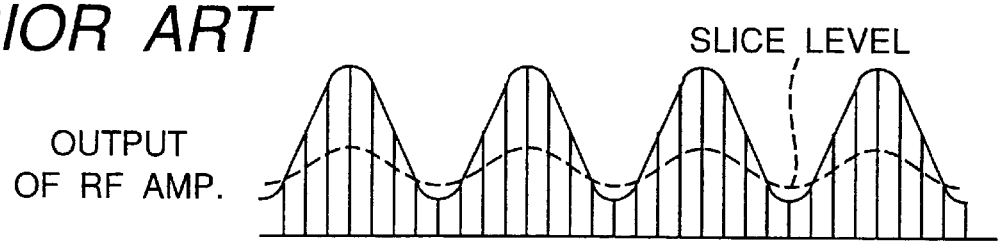
FIGS. 11A, 11B, 11C and 11D are timing charts showing the outputs of the RF amplifier and clock extracting unit, respectively.
Figure 11B:
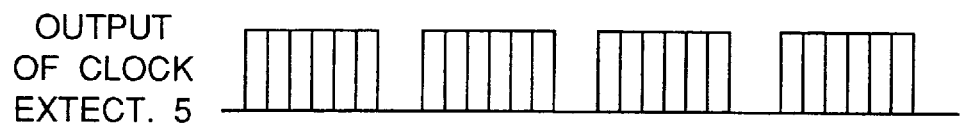
Figure 11C:
Figure 11D:
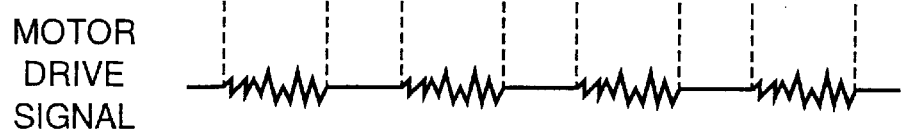

The following describes a second preferred embodiment of the spindle motor control system according to the present invention with reference to FIGS. 6, 7 and 8.

Since the basic structure of this embodiment is similar to that of the first embodiment except for providing a drive signal supervisory (DSS) unit 12 and a gate circuit (60), like parts are designated by the same reference numerals and the explanation of the redundant parts is omitted here.

FIG. 6 shows a construction of the second embodiment of the spindle motor control system in which the drive signal supervisory unit (referred to as "DSS unit" hereinafter) 12 is provided for receiving the spindle motor drive signal Smdl outputted from the CLV control unit 6. In the DSS unit 12, it is judged whether or not the level of the drive signal Smdl is beyond a given range and whether or not the remaining time period thereof is over a predetermined time interval. When the level of the drive signal is beyond the given range over the predetermined time interval, the DSS unit 12 outputs a L level signal, and otherwise, outputs a H level. The output signal (Sdj) of the DSS unit 12 and the output signal (Scpj) of the CPS unit 9 are both applied to the gate unit 60 which outputs a L level signal when any one of the outputs of the DSS unit 12 and the CPS unit 9 is of L level, and otherwise, the gate unit 60 outputs a H level.

FIG. 7 shows an example of a construction of the DSS unit 12 which is comprised of a window comparator 111, a fourth counter 112, and a comparator 113. The spindle motor drive signal Smdl outputted from the CLV control unit 6 is applied to the comparator 111 and the applied drive signal Smdl is compared with the given values Dmax and Dmin, where Dmax represents the maximum limit of the drive signal level and Dmin represents the minimum limit thereof.

When the level of the applied signal Smdl is in the given range of Dmax and Dmin, the comparator 111 outputs a H level signal, and otherwise outputs L level signal, which the output level is applied to the fourth counter 112. When the output of the comparator 111 is of L level, the count value counted by the fourth counter 112 is cleared up, which the output of the fourth counter 112 is applied to the comparator 113 for comparing the counted value with a given value Cmin which represents the minimum limit of the time interval.

When the count value outputted from the fourth counter 112 is smaller than the given value Cmin, the comparator 113 outputs a L level signal, and otherwise outputs a H level signal. The output signal of the comparator 113 is fed back to the fourth counter 112, and the output of the comparator 113 is also generated through an output terminal 215 of the DSS unit 12 as a drive signal judgment signal Sdj.

When the output level of the fourth counter 112 is below the given value Cmin, the comparator 113 generates a L level signal, and otherwise outputs a H level signal. When the L level output from the comparator 113 is fed back to the fourth counter 112, the fourth counter 112 advances the counting operation based on a third clock signal CLK3 having a predetermined frequency for counting operation applied via a second input terminal 213. In other words, when the level of the spindle motor drive signal Smdl is within the given range of Dmax and Dmin and the remaining period thereof is larger than the given value Cmin, the DSS unit 12 generates a H level signal as the drive signal judgment signal Sdj.

Thus, it is decided based on the drive signal judgment signal Sdj whether or not the spindle motor drive signal Smdl is beyond the given range over the predetermined time interval.

The following describes the operation of the spindle motor control system of the second embodiment.

Initially, in the case where the CLV control is stably performed, the operation thereof is similar to that of the first embodiment, and the redundant explanation thereof is omitted here for brief.

In the case where the reproduction data per se including the clock signal components for use in the CLV control is not obtained due to cracks and stains on the optical disk or due to external shock or vibrations applied from the outside, the CPS unit 9 first detects that the level of the clock components of the reproduction data transmitted from the clock extracting unit 5 is beyond the given range of Pmax and Pmin. Then, the judgment signal (Scpj) of the CPS unit 9 is applied in common to both the memory unit 11 and the changeover switching unit 7 via the gate unit 60, so that the memory unit 11 stops the renewal of holding the mean period value Sapd outputted from the averaging unit 10 and the memory unit 11 outputs the last stored data which was held immediately before the level of the clock components was beyond the given range. The mean period value read out from the memory unit 11 is applied to the CAV control unit 16 via the TPG unit 19. At the same time, the changeover switching unit 7 is changed over by selecting the second terminal 7b side for connecting the output of the CAV control unit 16 while opening the first terminal 7a side, turning off the transmission from the output Smdl of the CLV control unit 6, which the operation is similar to that of the first embodiment.

In the case where it is hard to decide in the CPS unit 9 whether the period level of the clock components is within or beyond the given range due to noises or the like applied to the reproduction data, the DSS unit 12 judges that the spindle motor drive signal Smdl outputted from the CLV control unit 6 is beyond the given range over the predetermined time interval, and then the drive signal judgment signal Sdj is applied to the gate circuit 60, so that the spindle motor can be rotated in accordance with the mean period value Sapd which was last stored in the memory unit 11 under the CLV control mode, so that the spindle motor can be stably rotated by switching from the CLV control mode to the CAV control mode.

Thus, even in the case where it is hard to decide by the CPS unit 9 whether the period of the extracted clock component is within or beyond the given range, the stable rotation of the optical disk can be maintained for reproducing the data without causing undesirable burst rotation of the optical disk.

The starting operation of the spindle motor drive control method is similar to that of the first embodiment shown in FIG. 5, the explanation thereof is omitted here.

In the present embodiment, although the clock extracting unit 5, CLV control unit 6, CPS unit 9, averaging unit 10, DSS unit 12, period detector unit 15, TPG unit 19, CAV control unit 16 and the like are individually constructed by way of circuitry arrangement, these constructions can be embodied in software for a microcomputer in a similar manner to that of the first embodiment.

The following describes an operation of the second embodiment of the spindle motor control system using a soft ware of a microcomputer with reference to a flow chart shown in FIG. 8.

Initially, in the case where the CLV control is stably performed, the operation thereof is similar to that of the first embodiment, and the redundant explanation thereof is omitted here for brief with regard to steps B1 through B5 which are similar to the steps A1 through A4 of FIG. 4 in the first embodiment except for incorporating the DSS judging step B4 in the second embodiment.

In the case where the reproduction data per se including the clock signal components for use in the CLV control is not obtained due to cracks and stains on the optical disk or due to external shock or vibrations applied from the outside, it is first detected that the level of the clock components of the extracted reproduction data is beyond the given range of Pmax and Pmin ("NO" in step B1). Then, the memory section stops the renewal of holding the mean period value Sapd and the memory section outputs the last stored data which was held immediately before the level of the clock components was beyond the given range. At the same time, the changeover switching is changed over by selecting the second connection to the output of the CAV control mode while opening the first connection side, turning off the CLV mode, which the operation is similar to that of the first embodiment.

In the case where it is hard to decide in the CPS section whether the period level of the clock components is within or beyond the given range due to noises or the like applied to the reproduction data, the DSS processing section judges that the spindle motor drive signal (Smdl) is beyond the given range over the predetermined time interval ("NO" in step B4), and then the drive signal judgment signal Sdj is applied to the gate processing section (60), the program is advanced to the step B6 and the mean value Sapd of the FG period held last in the memory section is read out as the target period to obtain the motor drive signal (Smdr) for the CAV control mode by the CAV control calculation. Then, in the next step B7, the motor drive signal (Smdr) for the CAV control mode is applied to the spindle motor 8 by selecting the connection to the second terminal side (7b), so that the spindle motor can be stably rotated in the CAV mode.

By these steps of the process, even in the case where it is hard to decide by the CPS unit 9 whether the period of the extracted clock component is within or beyond the given range, the stable rotation of the optical disk can be maintained by switching from the CLV control mode to the CAV control mode without causing undesirable burst rotation of the optical disk.

As described above, according to the second embodiment, when the spindle motor 8 is driven in the CLV mode in stable, the mean period value of the FG signal for a given time period is stored in the memory unit 11 at predetermined time intervals, and in the meanwhile, when the clock components of the reproduction data can not be extracted, the spindle motor is driven in the CAV control mode obtained by the CAV control unit 16 with use of the mean period value last stored in the memory unit.

Moreover, even in the case where the reproduction data per se including the clock signal components for use in the CLV control is not obtained due to cracks and stains on the optical disk or due to external shock or vibrations applied from the outside, or even in the case where it is hard for the CPS 9 unit to decide whether the clock components extracted from the reproduction data is within or beyond the given range over the predetermined time period, the DSS unit 12 judges that the spindle motor drive signal Smdl outputted from the CLV control unit 6 is beyond the given range over the predetermined time interval, so that the spindle motor can be rotated in the CAV control mode, so that the spindle motor can be stably rotated with high accuracy maintaining a CLV in rotating the optical disk without causing undesirable burst rotation of the optical disk.

It is noted here that the constructions of the CPS unit 9, averaging unit 10 and DSS unit 12 in the present embodiments are merely shown by way of example and other constructions may be used as long as the functions thereof can be effected. Also, it is not necessary to limit the numeric values thereof to those recited here and various numeric values may be used.

Moreover, in the present embodiments, although the period of the extracted clock components outputted from the clock extracting unit 5 and period of the FG signal generated by the frequency generator unit 14 are used, the frequency thereof may be detected in stead.

As described above, according to the first aspect of the present invention, when the clock components of the reproduction data can not be extracted, the spindle motor is driven in the CAV control mode attained by the CAV control calculation with use of the period mean value read out of the memory section, and even in the case where the reproduction data per se including the clock signal components for use in the CLV control is not obtained due to cracks and stains on the optical disk or due to external shock or vibrations applied from the outside, the stable rotation of the optical disk can be maintained in the CAV control mode for reproducing the data without causing undesirable burst rotation of the optical disk.

According to the second aspect of the present invention, when it is hard to decide whether the clock components extracted from the reproduction data is within or beyond the given range over the predetermined time period, the spindle motor can be rotated in the CAV control mode, maintaining the stable rotation of the optical disk with high accuracy without causing undesirable burst rotation of the optical disk.

Moreover, in the spindle motor control method, when the drive of the spindle motor is started from the static state thereof, it is judged whether or not the pickup position of the optical head is nearly coincident with the pickup position when the spindle motor was stopped immediately before the starting. In accordance with the judgment, the mean value Sapd of the FG period held last in the memory unit or a predetermined target period value set by the target period setting unit is applied to the CAV control unit to thereby promptly perform the CAV control calculation.

What is claimed is:

1. A spindle motor control system controlling a spindle motor for rotating an optical disk at a constant linear velocity for recording/reproducing data, said system comprising:
 a clock extracting unit which extracts a clock component from the reproduction data;
 a constant linear velocity control unit that controls the spindle motor by generating a first drive signal in accordance with the extracted clock component to thereby rotate the optical disk in a constant linear velocity mode;
 a rotational velocity detecting unit that detects a value corresponding to a current rotational velocity of the spindle motor;
 a constant angular velocity control unit that controls the spindle motor by generating a second drive signal in accordance with the current rotational velocity of the spindle motor detected by said rotational velocity detecting unit to thereby rotate the optical disk in a constant angular velocity mode; and
 a clock period supervisory unit that judges whether or not the clock component extracted from the reproduced data is within a given range in which constant linear velocity control can be stably performed, and that switches control of the spindle motor between said constant linear velocity control unit and said constant angular velocity control unit depending on whether said clock component extracted from the reproduced signal is within said given range.

2. The spindle motor control system as defined in claim 1, wherein when the extracted clock component is within the given range, the first drive signal generated by said constant linear velocity control unit is applied to the spindle motor for rotation in the constant linear velocity mode, and when the extracted clock component is beyond the given range, the second drive signal generated by said constant angular velocity control unit is applied to the spindle motor for rotation in the constant rotation velocity mode.

3. The spindle motor control system as defined in claim 1, wherein said clock period supervisory unit judges whether or not a clock period value of the clock component extracted from the reproduced data is within the given range.

4. The spindle motor control system as defined in claim 1, wherein said clock period supervisory unit judges whether or not a clock frequency value of the clock component extracted from the reproduced data is within the given range.

5. The spindle motor control system as defined in claim 1, wherein said rotational velocity detecting unit comprises a frequency generator that generates a frequency value in accordance with the rotational velocity of the spindle motor and a period detector unit that detects a period value based on the frequency value, the detected period value being applied to said constant angular velocity control unit.

6. The spindle motor control system as defined in claim 5, further comprising a memory unit for storing the period value detected by said period detector unit at predetermined time intervals when the extracted clock component is within the given range and the remaining time thereof is more than a predetermined value.

7. The spindle motor control system as defined in claim 6, wherein said memory unit stores a mean value of the period for a predetermined time interval when the spindle motor is rotated in the constant linear velocity mode, and the stored mean value of the period is applied to said constant angular velocity control unit when the spindle motor is rotated in the constant angular velocity mode.

8. The spindle motor control system as defined in claim 7, wherein said constant angular velocity control unit controls the drive of the spindle motor so that the period value detected by said period detector unit is made equal to the mean value of the period applied from said memory unit.

9. The spindle motor control system as defined in claim 1 further comprising a changeover switching unit which is switched between first and second connections in accordance with the judgment result by the clock period supervisory unit, where the first connection selects the output of the constant linear velocity control unit when the extracted clock component is within the given range while the second connection selects the output of the constant angular velocity control unit when the extracted clock component exceeds the given range.

10. The spindle motor control system as defined in claim 7, further comprising an averaging unit for calculating the mean value of the period detected by said period detector unit, and the calculated mean value is stored in the memory unit.

11. The spindle motor control system as defined in claim 7, further comprising a drive signal judging unit for judging whether or not the level of the spindle motor drive signal is beyond a given range and whether or not the remaining time period thereof is over a predetermined time interval.

12. The spindle motor control system as defined in claim 11, wherein when said drive signal judging unit judges that the level of the spindle motor drive signal is beyond the given range over the predetermined time interval, the mean period value stored in the memory unit is applied to said constant angular velocity control unit as a target period value for the rotational velocity of the spindle motor.

13. The spindle motor control system as defined in claim 7, further comprising a target period setting unit for setting a target period and a target period generator unit which selectively applies one of the mean period value fed from the memory unit and the target period set by said target period setting unit to the constant angular velocity control unit.

14. The spindle motor control system as defined in claim 13, wherein when the drive of the spindle motor is started from a static state for initially accessing or skipping in access on the optical disk, the target period value is so determined as to rotate the spindle motor with the frequency generated by the frequency generator unit having the same target period as that set by the target period setting unit.

15. The spindle motor control system as defined in claim 13, wherein when the pickup position of the optical head is nearly coincident with the pickup position before the drive of the spindle motor is stopped, the mean period value held last in the memory unit is read out as the target period for the constant angular velocity control calculation, while when the pickup position of the optical head is not nearly coincident with the pickup position before the drive of the spindle motor is stopped, the predetermined target period value set by the target period setting unit is applied to the constant angular velocity control unit via the target period generator unit to thereby perform the constant angular velocity control calculation.

16. A spindle motor control method controlling a spindle motor for rotating an optical disk at a constant linear velocity for recording/reproducing data, the method comprising the steps of:
   extracting a clock component from the reproduction data;
   controlling the spindle motor by generating a first drive signal in accordance with the extracted clock component to thereby rotate the optical disk in a constant linear velocity mode;
   detecting a value corresponding to a current rotational velocity of the spindle motor;
   controlling the spindle motor by generating a second drive signal in accordance with the detected current rotational velocity of the spindle motor to thereby rotate the optical disk in a constant angular velocity mode;
   judging whether the clock component extracted from the reproduced data is within a given range in which constant linear velocity control can be stably performed; and
   switching control of the spindle motor between said constant linear velocity control unit and said constant angular velocity control unit depending on whether said clock component extracted from the reproduced signal is within said given range.

17. The method as defined in claim 16, wherein when the extracted clock component is within the given range, the first drive signal is applied to the spindle motor for rotation in the constant linear velocity mode, and when the extracted clock component is beyond the given range, the second drive signal is applied to the spindle motor for rotation in the constant rotation velocity mode.

18. The method as defined in claim 16, wherein said rotational velocity detecting step includes a frequency generating step of generating a frequency value in accordance with the rotational velocity of the spindle motor and a period detecting step of detecting a period value based on the frequency value.

19. The method as defined in claim 18, further comprising a step of storing the detected period value at predetermined time intervals when the extracted clock component is within the given range and the remaining time thereof is more than a predetermined value.

20. The method as defined in claim 19, wherein said period storing step comprises a step of storing a mean value of the period for a predetermined time interval when the spindle motor is rotated in the constant linear velocity mode, and the stored mean value of the period is used when the spindle motor is rotated in the constant angular velocity mode.

21. The method as defined in claim 20, further comprises the step of controlling the drive of the spindle motor so that the detected period value detected is made equal to the mean value of the period obtained by the storing step.

22. The method as defined in claim 16 further comprising the step of switching between the first and second connections in accordance with the judgment result obtained by the clock period judging step, where the first connection is for selecting the constant linear velocity control mode when the extracted clock component is within the given range while the second connection is for selecting the constant angular velocity control mode when the extracted clock component exceeds the given range.

23. The method as defined in claim 20, further comprising the step of calculating the mean value of the period detected by said period detecting step, and the step of storing the calculated mean value.

24. The method as defined in claim 20, further comprising a drive signal judging step for judging whether or not the level of the spindle motor drive signal is beyond a given range and whether or not the remaining time period thereof is over a predetermined time interval.

25. The method as defined in claim 24, wherein when it is judged in said drive signal judging step that the level of the spindle motor drive signal is beyond the given range over the predetermined time interval, the mean period value obtained by the storing step is used in the constant angular velocity control calculation as a target period value for the rotational velocity of the spindle motor.

26. The method as defined in claim 20, further comprising a target period setting step for setting a target period and a target period generating step for selectively applying one of the mean period value and the target period obtained by said target period setting step to the constant angular velocity control calculation.

27. The method as defined in claim 26, wherein when the drive of the spindle motor is started from a static state for initially accessing or skipping in access on the optical disk, the target period value is so determined as to rotate the spindle motor with the frequency obtained by the frequency generating step having the same target period as that obtained by the target period setting step.

28. The method as defined in claim 26, wherein when the pickup position of the optical head is nearly coincident with the pickup position before the drive of the spindle motor is stopped, the mean period value obtained in the storing step is read out as the target period for the constant angular velocity control calculation, while when the pickup position of the optical head is not nearly coincident with the pickup position before the drive of the spindle motor is stopped, the predetermined target period value obtained by the target period setting step is applied to the constant angular velocity control calculation.

* * * * *